United States Patent Office 2,862,925
Patented Dec. 2, 1958

2,862,925

DERIVATIVES OF ALDOSTERONE

Tadeus Reichstein and Albert Wettstein, Basel, and Robert Neher, Binningen, Switzerland No Drawing. Application September 8, 1954
Serial No. 454,834

Claims priority, application Switzerland
September 11, 1953

23 Claims. (Cl. 260—239.55)

This application is a continuation-in-part of our application Serial No. 444,657, filed July 20, 1954, wherein there is described the biologically highly active compound aldosterone and a process for its preparation.

Degradation experiments with this new active substance resulted in determining that aldosterone is 11$\beta$,21-dihydroxy-3,20-diketo-4-pregnene-18-al and that in solution it enters into reaction as the semi-acetal. The formulae are written to show the two forms and to represent the equilibrium between them:

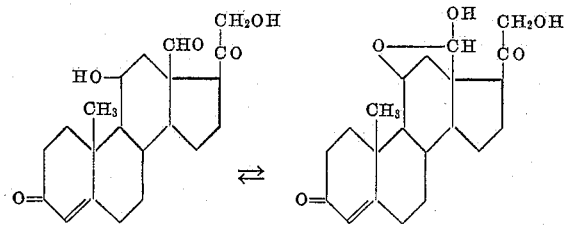

The present invention relates to functional derivatives of the new active substance, the hydroxyl and/or oxo groups being completely or partially functionally converted, for example, into oxygen, sulphur or nitrogen derivatives of aldosterone, such as esters, ethers, enol esters, enol ethers, acetals, ketals, their corresponding thio derivatives, for example thio ethers and thio acetals, further, hydrazones, oximes and other amino derivatives, such as enamines. The invention relates also to intramolecular derivatives which are derived from several functional groups of aldosterone by intramolecular condensation, such as the intramolecular 18:11,21-acetal from the 18-oxo group and the hydroxyl groups in 11- and 21-position.

In the esters and enol esters the acid residues can be those of any organic or inorganic acids, such as aliphatic, alicyclic, araliphatic, aromatic or heterocyclic, carboxylic, thioncarboxylic, thiolcarboxylic, or sulphonic acids, formic acid, acetic acid, chloroacetic acid, trifluoroacetic acid preferably of acids having more than two carbon atoms, as propionic acid, butyric acids, valeric acids, trimethyl acetic acid, diethylacetic acid, caproic acids, oenanthio acids, caprylic acids, palmitic acids, crotonic acid, undecanic acid, undecylenic acid, oxalic acid, succinic acid, pimelic acid, maleic acid, lactic acid, carbamic acids, alkoxy carboxylic acids, $\beta$-cyclopentyl-propionic acid, hexahydrobenzoic acid, benzoic acid, phenyl-acetic acid, cyclohexylacetic acid, phenylpropionic acids, trimethyl gallic acid, phthalic acid; furane-2-carboxylic acid, isonicotinic acid, methane sulphonic acid, toluene sulphonic acid, sulphuric acids, hydrohalic acids or phosphoric acids.

In the ethers, enol derivatives, such as enol ethers, acetals and ketals or in the corresponding thio or nitrogen derivatives, the residues can likewise belong to the aliphatic, alicyclic, araliphatic, aromatic or heterocyclic series. Among the latter the enamines may be specially mentioned. Such residues may be, for example, an alkyl or alkylene group, such as a methyl, ethyl, ethylene or propylene group, an aralkyl group, such as benzyl, di- or a triphenyl methyl group, a tetrahydropyranyl group, a pyrrolidine or piperidine residue, or a sugar residue such as that of glucose, galactose or maltose.

The new compounds are produced from aldosterone by any suitable method. For the manufacture of the esters and enol esters, there can be used, for example, the above specified acids, their halides, anhydrides or thiol derivatives, or also ketenes; reesterification methods can also be used. For the etherification or acetalisation there are used, for example, reactive esters of corresponding alcohols, especially such of the hydrohalic acids, organic sulphonic acids or of ortho-formic acid, alternatively also free alcohols, silicon tetraalkyls and the like. According to the agents used, the reaction is conducted in the presence of acid or basic condensing agents or catalysts, for example, sulphonic acids, mineral acids, such as hydrochloric acids or sulphuric acids, or organic bases, especially tertiary amines.

The thio acetals and thio-enol ethers are obtained for example by treatment of aldosterone with mercapto compounds. Thio-enol ethers and, for example, 11:18-oxygen-sulphur-acetals are prepared advantageously by reacting resulting acyclic thio-acetals with heavy metal derivatives forming mercaptide. As mercapto compounds there are used especially alkyl mercaptans, for example methyl, ethyl, benzyl-mercaptan, or ethylene di-mercaptan and the like in the presence of acid catalysts, such as for example hydrochloric acid, sulphuric acid, toluene sulphonic acid, zinc chloride or pyridine hydrochloride. Heavy metal derivatives forming mercaptides are especially oxides or inorganic or organic salts, for example chlorides, nitrates, carbonates, acetates, propionates, benzoates of mercury, cadmium, silver, copper, lead, bismuth, cobalt or nickel. The reaction is advantageously carried out with the exclusion of water and, if desired, in the presence of organic or inorganic acid-binding agents, for example pyridine, collidine or carbonates, such as alkali, alkaline earth or heavy metal carbonates. Mercaptan can also be split off from the acyclic thio-acetals by thermal action.

By suitable selection of the reaction conditions and the quantity of the agents, it is possible to convert functionally, for example to esterify or etherify, the hydroxyl or oxo groups present either completely or only partially.

In compounds obtained, functionally converted hydroxyl or oxo groups can be converted into the free groups. In this way it is also possible in polysubstituted derivatives to liberate only part of the functionally converted groups. This reaction can be carried out for example by chemical or enzymatic hydrolysis, for example using an acid or basic agent, by transesterification, transacetalization or especially in the case of araliphatic acid or alcohol residues also by hydrogenation. The cyclic semi-acetals are obtained from oxygen-sulphur-acetals, for example from those in 11:18-position, advantageously by means of heavy metal salts, such as mercury chloride in the presence of basic agents, such as for example cadmium carbonate. From the derivatives obtained in this manner, or also obtained directly, and which are only partially converted, for example esterified or etherified, by subsequent functional conversion, for example by esterification or etherification, polysubstituted derivatives can be prepared, especially mixed esters or ethers or ester-ethers. By suitable selection of the reaction conditions it is also possible to regenerate the free active substance from the partially or completely converted derivatives with the above specified agents. It is surprising that, for example the hydrolysis of the esters can be carried out with good yields by chemical or by enzymatic methods, for example by the action of alkali bicarbonates or of suitable esterases, for example from horse serum which result was not to be expected owing to the known high sensitivity of crude preparations of the new active substance.

It thus becomes evident from the foregoing that the invention provides esters and ethers of aldosterone in which at least one of the positions 18 and 21 is esterified or etherified.

The invention also includes a process in which only a part of the above described stages is carried out, for example a partial hydrolysis of polyesters and polyethers, and/or the further esterification or etherification of derivatives which are only partially esterified or etherified.

The products of the present process constitute a considerable advance in the therapy of suprarenal cortex hormones and they can be used as medicaments or as intermediate products for the preparation thereof. More particularly compounds comprising the invention can be used where aldosterone is employed. Like aldosterone, the derivatives have activity in mineral metabolism and can be used in the treatment of suprarenal insufficiencies.

The following examples illustrate the invention:

EXAMPLE 1

20 mg. of aldosterone of double melting point 104–112° C. and 153–158° C. are dissolved in 0.3 cc. of dry pyridine and the solution treated at 0° C. with 200 mg. of acetic anhydride and the whole allowed to stand for 2 days at 25° C. The product is dissolved in pure ether, washed several times with cold, dilute hydrochloric acid, water, sodium bicarbonate solution and water, using 1.5 cc. each time, dried over sodium sulphate and evaporated under vacuum. The residue (23 mg.) is chromatographed on 1.2 gms. of aluminum oxide of activity II. The first eluates with benzene-petroleum ether (1:1) are rejected, the final eluates and also those with benzene contain the polyacetate of the active substance, which is obtained therefrom in the form of a colorless glass. Acyloxy determination carried out according to the hydroxamate method (A. Zaffaroni, Recent Progress in Hormone Research, vol. 8, page 78 et seq. (1953)) shows that, assuming an approximate molecular weight of 430, 2 acetoxy groups are present.

By evaporation of a methanol solution of the above reaction product under vacuum, the crystalline aldosterone diacetate is obtained which melts at 70–72° C. and has the formula

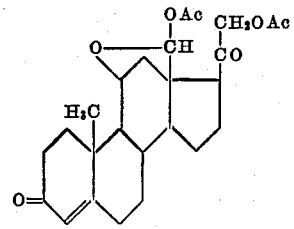

The infra-red spectrum of the compound in carbon disulphide exhibits in the double bond region at 5.67μ, 5.75μ, 5.93μ and 6.17μ, and also in the fingerprint region, for example at 9.36μ, 9.52μ, 9.98μ, 10.23μ, 10.41μ, 10.55μ, 11.08μ and 11.58μ pronounced bands, but no longer any in the hydroxyl region.

For purification of the diacetate described there can be used instead of chromatography on aluminum oxide, also a partition chromatography on silica gel. In this latter operation there is used as stationary phase water-methanol (1:1) and as the mobile phase benzene-petroleum ether (2:3).

The same compound is produced when the aldosterone is acetylated with acetyl chloride or ketene instead of acetic anhydride or when one of the partial acetates described in Examples 2 and 4 below is re-acetylated under the specified conditions.

In a similar manner, for example the corresponding di-propionate, di-isobutyrate or di-benzoate of aldosterone can be prepared.

From the above described diacetate the free active substance can be obtained as follows:

To a solution of 8.32 mg. of diacetate in 1.3 cc. of methanol are added 10 mg. of potassium bicarbonate in 0.35 cc. of water and the whole allowed to stand in an evacuated sealed tube for 48 hours at 20° C. The reaction product is then filtered from traces of a precipitate and the filter washed with 70% methanol. The clear filtrate is freed from methanol under vacuum and the aqueous residue extracted twice, in each case with 50 cc. of chloroform-ether (1:3), the chloroform-ether solution washed with water, dried over sodium sulphate and evaporated under vacuum. The residue (5.19 mg.) crystallises from a little acetone-ether. The crystals exhibit the characteristic double melting point of the free active substance aldosterone.

The aldosterone used as starting material may be prepared as follows:

500 kilograms of fresh or freeze-dried adrenals of cattle are extracted according to a known process, preferably according to Cartland and Kuizenga (J. Biol. Chem., 116, 57 (1936)). Depending on the quality of the glands, there are obtained 100–500 grams of crude extract, which is thoroughly defatted by distribution between aqueous alcohol, for example methanol of 30 percent strength, and petroleum ether. The aqueous phase is extracted after eliminating the alcohol (all operations are carried out at a temperature of less than 50° C.) four times with the same volume of a mixture of ether and chloroform (2:1 or 3:1; the solvents should be thoroughly purified beforehand). The combined ether and chloroform solutions are evaporated in vacuo either as they are or after being washed with dilute hydrochloric acid and a solution of hydrogen carbonate and dried over sodium sulphate. In this way there are obtained 23–30 grams of purified extract.

The aforementioned extract is subjected to partition chromatography on a large column, the stationary phase consisting of 100–200 times the quantity of kieselguhr to water in a weight ratio of 1:1 and the mobile phase consisting of petroleum ether, benzene and chloroform. The speed of passage of the eluates should be about 90–100 cc. an hour, the volume of each fraction 1000–1200 cc. The residues of the several fractions obtained by evaporation in vacuo, from which, partly, some of the known corticosteroids are already obtained in a crystalline form, are analysed by paper chromatography. The new compound can be detected, for example with the aid of $R_F$-values, ultra-violet absorption and the power to reduce a solution of silver diamine, in such fractions as are obtained by elution with a mixture of benzene and petroleum ether 7:3 to 9:1. The fractions in question (300–400 mg.) are then purified and separated on a second column of purified cellulose powder by distribution between aqueous methanol of 60 percent strength and a mixture of petroleum ether and toluene (1:2 to 1:3); the weight ratio of substance to cellulose being about 1:100 and that of stationary phase to cellulose 1:2. For the passage of a single fraction (40 cc.) about 5 hours are needed. The fractions obtained by evaporation are again analysed by paper chromatography. From the selected and combined fractions the substance can then be crystallized by means of a mixture of acetone and ether, advantageously in the presence of a little water. By recrystallization there are obtained colourless crystals of aldosterone in the form of the hydrate having the double melting point 104–112° C. and 153–158° C., which are unitary and possess a high biological efficacy on mineral metabolism. The C, H determination of the product dried in high vacuum at 50° C. yields the following values: carbon 69.68%, hydrogen 8.39%; calculated for $C_{21}H_{28}O_5$: carbon 69.97%, hydrogen 7.83%. The other properties of the dried compound do not deviate substantially from those of the hydrate.

EXAMPLE 2

20 mg. of aldosterone are dissolved in a little acetone, treated with a little absolute benzene and well dried by evaporation under vacuum at 50° C. The residue is dissolved in 0.15 cc. of dry pyridine, mixed with 10 mg. of acetic anhydride and the whole allowed to stand for 7 hours at 20° C. Evaporation is then carried out under vacuum at 50° C., the residue is dissolved in 5 cc. of a chloroform-ether mixture (1:3) and the solution is washed at 0° C. several times with 0.5 N-hydrochloric acid, sodium carbonate solution and water using 1 cc. each time. The washings are introduced into a second separating funnel containing 3 cc. of chloroform-ether and then undergo further extraction by shaking. The combined extracts are dried over a little sodium sulphate and evaporated at 50° C. The residue (about 22.5 mg.) is treated with 0.1 cc. of acetone and 1 cc. of ether and crystallized at 0° C. Colorless crystals combined in spherical clusters of melting point 190-192° C. are obtained, which crystals, at 20° C., rapidly and strongly reduce alkaline silver diammine solution.

The new compound is the 21-monoacetate of aldosterone having the formula

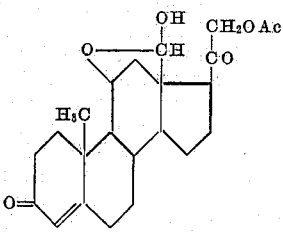

By the use of the hydroxamate method, one acetoxy group can be detected in this compound.

The infra-red spectrum in chloroform shows characteristic bands, for example at 2.78µ (free hydroxyl group), at 5.72µ, 5.82µ, 5.97µ, and 6.16µ in the double bond region and at 8.83µ, 9.41µ, 9.66µ, 10.00µ, 10.18µ, 10.41µ, 11.15µ and 11.55µ in the fingerprint region.

From the mother liquors of the pure crystals there can be obtained by chromatography on aluminium oxide or magnesium silicate or by partition chromatography, besides a little aldosterone diacetate, a further quantity of the pure 21-monoacetate. On aluminium oxide, the di-acetate is eluted with pure benzene and benzene-ether (1:1). The 21-monoacetate then follows with pure ether or with ether-ethyl acetate or ether-methanol.

In an analogous manner aldosterone can be esterified in 21-position with propionic acid, valeric acid, undecylenic acid, trimethyl-acetic acid, cyclopentylpropionic acid, phenyl-acetic acid or benzoic acid.

EXAMPLE 3

10 mg. of the 21-monoacetate of aldosterone of M. P. 190–192° C., described in Example 2, are dissolved in 50 mg. of dry pyridine and treated with 6 mg. of benzoyl chloride in a little chloroform at 0° C. After 12 hours' standing at 24° C., working up is carried out as described in Example 1 and the crude acetate-benzoate is purified by chromatography on aluminium oxide using petroleum ether, benzene and ether as eluting agents. The amorphous acetate-benzoate eluted with a mixture of petroleum ether and benzene gives, on determination of the acyl groups by the hydroxamate method, a value in good agreement with a monoacetate-monobenzoate.

This compound is the 21-acetyl-18-benzoyl-aldosterone of the formula

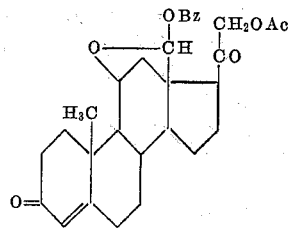

In an analogous manner 21-acetyl-18 valeroyl-aldosterone and 21-acetyl-18-trimethylacetyl-aldosterone can also be prepared.

EXAMPLE 4

10 mg. of aldosterone are acetylated as described in Example 1 and worked up. For partial hydrolysis, the amorphous crude product is allowed to stand for several days in a moist solvent, such as aqueous ether or acetone and then the solution evaporated under vacuum. The residue is subjected to partition chromatography on silica gel using benzene-petroleum ether (2:3) as the mobile phase and methanol-water (1:1) as the stationary phase. By this means the 18-monoacetate of aldosterone melting at 220° C. and of the formula

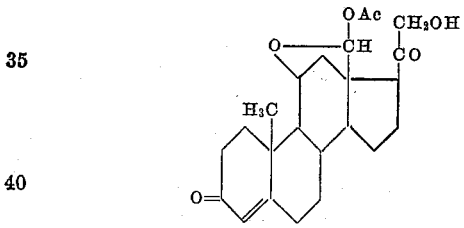

is obtained. The figure for acetoxy groups determined by the hydroxamate method gave, calculated for a molecular weight 388.5, a value in good agreement with a monoacetate. In the infra-red spectrum in chloroform solution, among others there are exhibited the typical bands of the hydroxyl group and of the acetoxy group (in the double bond region).

The partial hydrolysis of the diacetate and of other diesters including mixed diesters can also be carried out with potassium bicarbonate in an aqueous-methanolic medium under mild conditions, or also by means of enzymatic methods.

The 18-monopropionate and the 18-monobenzoate of aldosterone are, for example, obtained in an analogous manner, by partial hydrolysis of the 18,21-dipropionate- and 18,21-dibenzoate of aldosterone.

The described mono- and diacetates and also aldosterone itself give on 1–2 hours' boiling with 1 percent methanolic or aqueous hydrochloric acid or on 1–2 days' standing at 20° C., a mixture of compounds from which by means of acetone-ether colorless needles of melting point 218–224° C. can be crystallized. They can be sublimed without decomposition under a vacuum of 0.05 mm. at about 160° C.

EXAMPLE 5

5 mg. of the 18-monoacetate of aldosterone described in Example 4 are dissolved in 25 mg. of dry pyridine, treated at 0° C. with 2.8 mg. of trimethylacetyl chloride in a little chloroform and the whole allowed to stand for 24 hours at 25° C. After the customary working up and chromatography, as described in Example 1, the 21-trimethylacetyl-18-acetyl-aldosterone of the formula

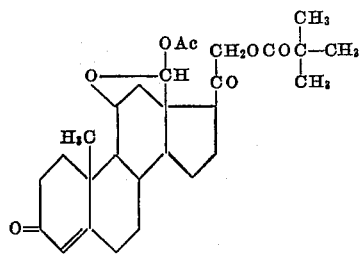

is obtained.

In an analogous manner but replacing the trimethylacetyl chloride by equivalent amounts of valeroyl chloride, benzoyl chloride, oenanthoyl chloride, undecylenoyl chloride and cyclopentylpropionyl chloride there can also be prepared, for example, the 21-valerate, 21-benzoate, 21-oenanthate, 21-undecylenate and 21-cyclopentylpropionate, respectively of 18-acetyl-aldosterone.

EXAMPLE 6

3 mg. of aldosterone are dissolved in 1.2 cc. of 0.5 N-aqueous hydrochloric acid and allowed to stand at room temperature for 48 hours. The reaction mixture is then extracted with chloroform-ether (1:3) and, after washing the organic solvent with dilute potassium bicarbonate solution and water, it is dried over sodium sulphate and evaporated in vacuo. The residue (about 3 mg.) is chromatographed on 0.1 gram of aluminium oxide free from alkali using benzene-petroleum ether (1:1), benzene, benzene-ether (1:1), ether and ethyl acetate as eluting agents. After sublimation in high vacuo and crystallization from ether, the ethyl acetate eluate yields small clusters of flat, rectangularly cut rods melting at 196–206° C. This compound is the 18:11,21-acetal of aldosterone of the formula

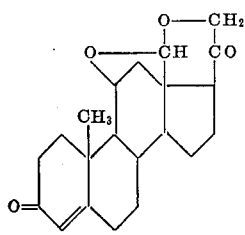

In the ultra-violet spectrum it shows a maximum of absorption at about 240μ, but does not reduce triphenyltetrazolium chloride.

EXAMPLE 7

6 mg. of 18:11, 21-acetal of aldosterone melting at 196–206° C. described in Example 6 are dissolved in 0.6 cc. of acetic anhydride and, after adding 0.001 cc. of concentrated sulphuric acid, the whole is allowed to stand for about 1 hour at room temperature. The reaction mixture is poured on to ice, extracted with chloroform-ether (1:3), the chloroform-ether solution is washed with potassium carbonate and water and, after being dried over sodium sulphate, is evaporated in vacuo. The residue is purified according to the method described in Example 1 and yields aldosterone-diacetate.

EXAMPLE 8

9 mg. of 18:11, 21-acetal of aldosterone melting at 196–206° C. described in Example 6, 9 mg. of ethylene glycol, 0.1 mg. of paratoluene-sulphonic acid monohydrate and 20 cc. of benzene are boiled under reflux for 4 hours using a small water separator with dry silica gel. After cooling, the reaction mixture is washed with aqueous potassium bicarbonate solution and water. The aqueous extracts are extracted once again with 10 cc. of benzene, the benzene solutions are combined and after being dried over sodium sulphate are evaporated in vacuo. After chromatographic purification in a manner analogous to that described in Example 1 there is obtained the 3-ethyleneketal of 18:11,21-acetal of aldosterone of the formula

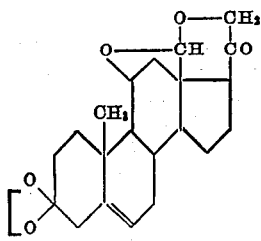

The 3-ethylene ketal can be split by heating with aqueous acetic acid or by being left to stand in acetone in the presence of a catalytic quantity of para-toluene-sulphonic acid monohydrate, and the 18:11,21-acetal of aldosterone used as starting material is obtained.

EXAMPLE 9

A mixture prepared while cooling, of 7.8 mg. of the 3-ethylene ketal of 18:11,21-acetal of aldosterone described in Example 8, 2.72 mg. of freshly melted zinc chloride, 0.02 cc. of methyl mercaptan and a few drops of carbon tetrachloride is allowed to stand for 4 hours at about −10° C. The whole is then diluted with a little carbon tetrachloride, washed with dilute sodium carbonate solution and water, and after drying the carbon tetrachloride solution over sodium sulphate it is evaporated in vacuo.

The crude $\Delta^5$-3-ethylene dioxy-11$\beta$:21-dihydroxy-20-oxo-pregnene-18-one-dimethyl-thioacetal thus obtained is dissolved without purification in a few drops of ethanol, mixed with 5.44 mg. of mercury chloride and allowed to stand for 1 hour. The whole is then heated for a short time at 70° C. and filtered off from mercury chloride-mercaptide. Hydrogen sulphide is introduced into the cooled filtrate, filtered, washed with a little ethanol and the filtrate concentrated in vacuo at room temperature after being previously treated for a short time with a little silver carbonate. The residue is taken up in chloroform-ether (1:3), washed with water and the solvents evaporated in vacuo after being dried over sodium sulphate. In this way there is obtained the 11-oxygen-18-methylthio-acetal of $\Delta^5$-3-ethylene dioxy-11$\beta$:21-dihydroxy-18:20-dioxo-pregnene of the formula

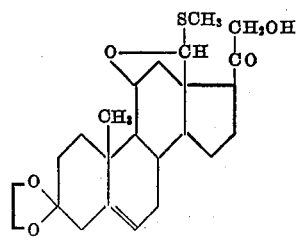

On heating this compound with aqueous acetic acid there is obtained the 18-methyl-thioside of aldosterone of the formula

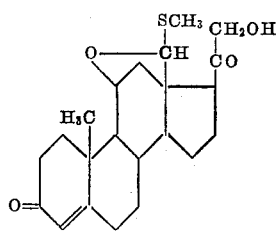

which shows a strong absorption at about 240μ. By treatment with mercury chloride in the presence of cadmium carbonate in acetone solution there is obtained aldosterone.

The methyl thioside of aldosterone-3-ethylene ketal can also be converted into aldosterone in the reverse sequence by de-sulphurizing it first with mercury chloride and cadmium carbonate to the aldosterone ethylene ketal of the formula

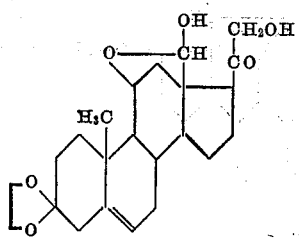

and then splitting the latter by heating with dilute acetic acid.

EXAMPLE 10

2.1 milligrams of aldosterone are heated with some absolute benzene at 50° C. under reduced pressure, then dissolved in 0.02 cc. of absolute pyridine and treated with 0.17 cc. of a 10 percent solution of benzoyl chloride in absolute benzene. After allowing the reaction mixture to stand at 20° C. for 48 hours, it is distilled to dryness in vacuo, the residue taken up in 5 cc. of a mixture of ether and chloroform (3:1), and washed neutral with water, 0.5 N-hydrochloric acid, 0.5 N-sodium carbonate solution, and water, using 0.5 cc. each time. The acid and alkaline washings are extracted separately with a small quantity of solvent. All ether-chloroform solutions are combined and dried over sodium sulfate. After distilling off the solvent, the amorphous residue (2.0 milligrams) is taken up in a little ether-acetone and allowed to crystallize in the cold.

On washing the crystals with a little chloroform there is obtained the 21-monobenzoate of aldosterone in the form of fine, colorless clusters of needles melting at 203–211° C. (with decomposition). The infra-red absorption spectrum (in chloroform) shows characteristic bands at $2.77\mu$ (free —OH group), $5.79\mu$ with double structure at about $5.85\mu$ (benzoate and 20-ketone), $5.98\mu$ ($\alpha,\beta$-unsaturated 3-ketone), furthermore at 6.89, 7.29, 7.61, 9.03, 9.36, 9.61, 10.01, 10.16 and $11.12\mu$.

EXAMPLE 11

4.1 mg. of aldosterone hydrate is mixed with a little benzene, and the solvent is evaporated to dryness in vacuo at 50° C. The residue is dissolved in 0.02 cc. of absolute pyridine and allowed to stand for 17 hours at 20° C. with 0.13 cc. of a solution of trimethyl-acetyl chloride of 10 percent strength. The pyridine is then distilled off in vacuo, the residue dissolved in 5 cc. of chloroform and washed with 1 cc. each of water, 0.1 N-hydrochloric acid, 1 N-caustic soda solution and water. The aqueous solutions are extracted once more with chloroform. After drying and evaporating the chloroform solutions, 4.3 mg of an amorphous residue is obtained which is purified by paper-chromatography using a mixture of benzene and petrol ether as mobile phase and a mixture of methanol and water as stationary phase (System B₃ according to Bush). Three absorbing zones in the ultraviolet region are observed, of which the most polar still contains some aldosterone. From the less polar zone a lactone melting at 284–288° C. could be elutriated, whilst from the most weakly polar zone 3.0 mg. of crude aldosterone 21-mono-trimethyl acetate of the formula

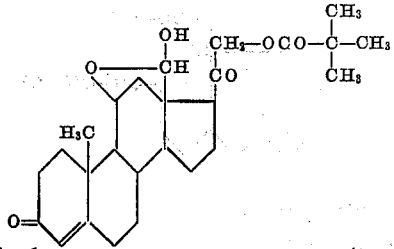

are obtained.

For the purpose of further purification the crude product is chromatographed over 250 mg. of aluminium oxide, elutriation being carried out with portions of 1 cc. each of mixtures of petroleum ether and benzene 2:1 and 1:1, benzene, mixtures of benzene and ether 1:1, ether, mixtures of ethyl acetate and ether 1:1, and ethyl acetate. From the fractions eluated with ether and ethyl acetate there is obtained the pure, amorphous mono-trimethyl acetate. When examined by paper-chromatography (System Bush B₃) it exhibited an $R_F$ value of 0.58 and also strong reducing capacity, an ultraviolet absorption and with a caustic soda solution a yellow fluorescence, whilst no typical colour reaction is observed with phosphoric acid. The $R_F$ value in the propylenglycol toluene system is 0.68. In the infra-red absorption spectrum of the substance dissolved in methylene chloride bands are observed at $2.77\mu$ (OH), $5.77$ (ester), $5.82$ (20-ketone), $5.98$ ($\Delta^4$-3-ketone) and $6.18\mu$ (double bond). And in the fingerprint region bands are found at 6.91; 7.35; 7.53; 8.17; 8.25; 8.43; 8.69; 9.68; 10.00; 10.18; 10.44; and $10.70\mu$.

Functional derivatives especially the esters of aldosterone can be used as medicaments, for example, in the form of pharmaceutical preparations which contain them in admixture with a pharmaceutical organic or inorganic solid or liquid carrier material suitable for enteral, parenteral or topical application. For the production of these preparations such substances are concerned as do no react with the new compounds, so for example water, gelatine, lectose, starch, magnesium, stearate, talc, vegetable oils, benzyl alcohols, gums, polyalkylene glycols, Vaseline, cholesterol, or other medicament carriers. The pharmaceutical preparations can take the form of, for example, tablets, dragees, salves, creams, or are in liquid form with functional derivatives of aldosterone dissolved or suspended, for example, in microcrystalline or emulsified form. They are sterilized if desired, and/or may contain auxiliary substances such as preservatives, stabilizing, wetting or emulsifying agents, salts which vary the osmotic pressure, or buffer substances. They may also contain other therapeutically valuable substances. The pharmaceutical preparations are obtained by the usual methods. The percentage of the functional derivatives of aldosterone may be varied, the aldosterone derivative being in an effective amount. Thus, the range of concentration of the aldosterone derivative may vary from about 0.005 percent to about 50 percent. Tablets may contain from about 0.05 mg. to about 500 mg. and suspensions and solutions from about 50γ to about 500 mg. per cc. For example the following preparations can be made:

*1. Oily injection solution*

[Ampoules of 100γ per 1 cc. for injection.]

| | |
|---|---|
| Aldosterone-diacetate | 100γ |
| Neutral sesame oil free from peroxide to make up to 1 cc. | |

*2. Aqueous suspension for injection*

[.01 mg. per 1 cc.]

| | Mg. |
|---|---|
| Aldosterone-diacetate | 0.10 |
| Na-carboxymethyl cellulose | 5.00 |
| Sodium chloride | 7.50 |
| Primary sodium phosphate | 2.00 |
| Secondary sodium phosphate | 1.00 |
| Mercury sodium thiosalicylate | 0.01 |
| Sorbitan-monolaurate ethylene-oxide ether | 1.00 |
| Distilled water to make up to 1.00 cc. | |

3. Tablets

| | |
|---|---|
| Aldosterone-21-monoacetate | 1.00 |
| Lactose | 53.00 |
| Gelatin | 1.00 |
| Starch | 39.50 |
| Magnesium stearate | 0.30 |
| Talc | 5.20 |
| | 100.00 |

4. Tablets for mucosal absorption

| | Mg. |
|---|---|
| Aldosterone-diacetate | 1.00 |
| p-Stearoyl-amino-phenyl-trimethyl ammonium-methylsulfate | 0.05 |
| Lactose | 75.00 |
| Confectioners' sugar | 85.00 |
| Stearin | 2.00 |
| Talc | 11.95 |
| | 175.00 |

What is claimed is:

1. A compound in pure form of the formula:

[structural formula with $O-CH-OR_1$ and $CO-CH_2-OR_2$ groups]

in which $R_1$ is a member selected from the group consisting of hydrogen, an acyl- and a hydrocarbon radical and $R_2$ is a member selected from the group consisting of hydrogen and an acyl radical, the acyl radicals of said groups being a member selected from the group consisting of alkanoyl, aralkanoyl, aroyl, cycloalkyl-alkanoyl and cyclo-alkanoyl having less than 20 carbon atoms and the hydrocarbon radicals having less than 8 carbon atoms, and in which at least one of the groups $R_1$ and $R_2$ are carbon containing radicals.

2. A member selected from the group consisting of an 18-monoester and a 21-monoester of the compound, in pure form, of the formula:

[structural formula with OH, $O-CH$ and $CO-CH_2-OH$ groups]

the acyl radical of the ester groups being a member selected from the group consisting of alkanoyl, aralkanoyl, aroyl, cycloalkyl-alkanoyl and cycloalkanoyl having less than 20 carbon atoms.

3. A member selected from the group consisting of an 18-mono-aliphatic carboxylic acid ester and a 21-mono-aliphatic carboxylic acid ester of the compound, in pure form, of the formula:

[structural formula with OH, $O-CH$ and $CO-CH_2-OH$ groups]

the acyl radical of the said esters having not more than 20 carbon atoms.

4. A compound of the formula:

[structural formula with $CO-CH_2-O-OC-CH_3$ group]

in pure form.

5. A compound of the formula:

[structural formula with $CO-CH_2-O-OC-CH_2-CH_3$ group]

in pure form.

6. A compound of the formula:

[structural formula with $CO-CH_2OOC-C(CH_3)_2-CH_3$ group]

in pure form.

7. A compound of the formula:

[structural formula with $CO-CH_2O-CO-(CH_2)_3-CH_3$ group]

in pure form.

8. A compound of the formula:

[structural formula with $CO-CH_2-O-OC-CH_2-CH_2-$cyclopentyl group]

in pure form.

9. A compound of the formula:

[structural formula with $O-CO-CH_3$ and $CO-CH_2-OH$ groups]

in pure form.

10. A compound of the formula:

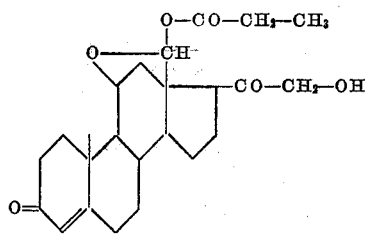

in pure form.

11. A compound of the formula:

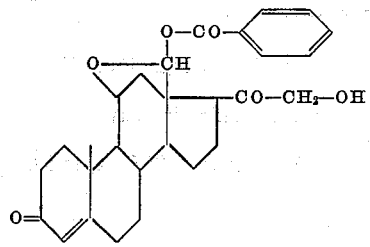

in pure form.

12. A compound of the formula:

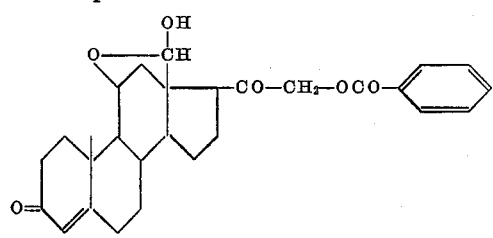

in pure form.

13. A compound in pure form of the formula:

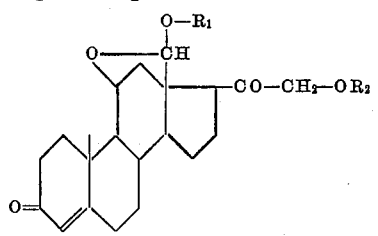

wherein $R_1$ and $R_2$ are members selected from the group consisting of an alkanoyl, aralkanoyl, aroyl, cycloalkylalkanoyl and cycloalkanoyl radical having less than 20 carbons atoms.

14. A compound in pure form of the formula:

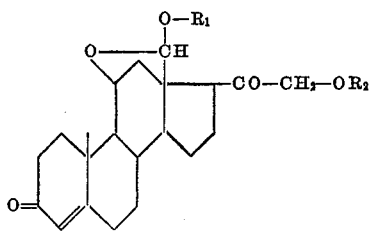

wherein $R_1$ and $R_2$ are members selected from the group consisting of an alkanoyl, aralkanoyl, aroyl, cycloalkylalkanoyl and cycloalkanoyl radical having less than 20 carbon atoms and more than 2 carbon atoms.

15. A compound in pure form of the formula:

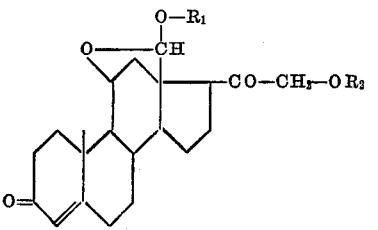

wherein $R_1$ and $R_2$ are members selected from the group consisting of an alkanoyl, aralkanoyl, aroyl, cycloalkylalkanoyl and cycloalkanoyl radical and in which $R_1$ and $R_2$ are different radicals.

16. A compound of the formula:

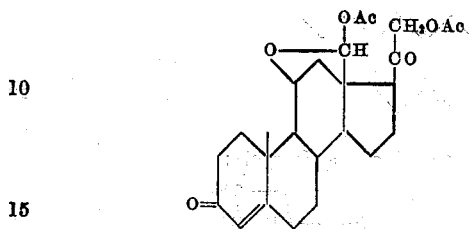

in pure form.

17. A compound of the formula:

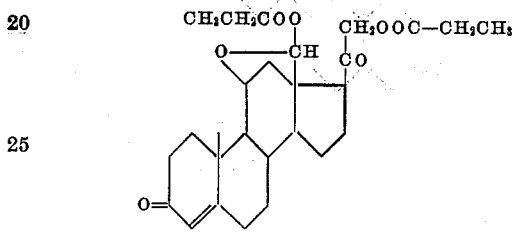

in pure form.

18. A compound of the formula:

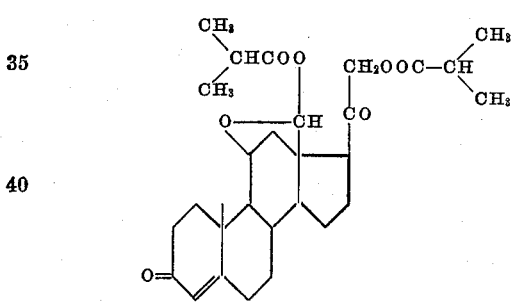

in pure form.

19. A compound of the formula:

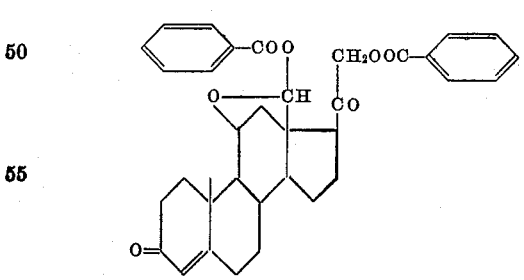

in pure form.

20. A compound of the formula:

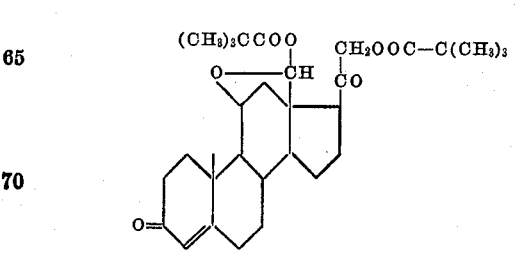

in pure form.

21. A compound of the formula:
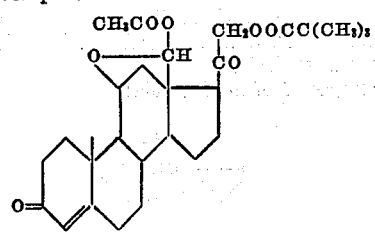
in pure form.
22. The compound of the formula:
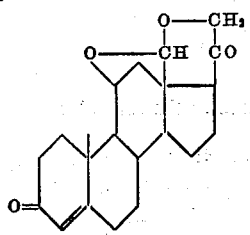
23. The compound of the formula:
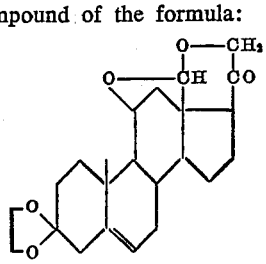
References Cited in the file of this patent
Acta Endocrinol (1952), vol. 11, pages 199–220, 167–77.
Helvetica Chem. Acta, pages 1163–1223 (1954), vol. 37.
Simpson: "Soc. for Endocrinology," May 23, 1953, vol. 2, pages 9–24.
Pincus: "The Hormones," 1955, pages 572–574.